(No Model.)

C. L. MAYHEW.
AUTOMATIC CIRCUIT CONTROLLER.

No. 510,646. Patented Dec. 12, 1893.

Witnesses
Jno. G. Hinkel
A. N. Dobson

Inventor
Charles L. Mayhew
By Foster Freeman
Attorneys

UNITED STATES PATENT OFFICE.

CHARLES L. MAYHEW, OF SARATOGA SPRINGS, NEW YORK.

AUTOMATIC CIRCUIT-CONTROLLER.

SPECIFICATION forming part of Letters Patent No. 510,646, dated December 12, 1893.

Application filed May 26, 1893. Serial No. 475,597. (No model.)

*To all whom it may concern:*

Be it known that I, CHARLES L. MAYHEW, a citizen of the United States, residing at Saratoga Springs, in the county of Saratoga and State of New York, have invented certain new and useful Improvements in Automatic Circuit-Controllers, of which the following is a specification.

My invention relates to automatic circuit controllers adapted more especially to control the circuits of electric gas lighting devices, and to protect the battery and prevent its running down or becoming short-circuited through an accidental closure of the circuit, and it has for its object to provide a simple, cheap and effective means, which shall be automatic in its action, and to these ends my invention consists in a device embodying the features of construction substantially as hereinafter set forth.

Figure 1:
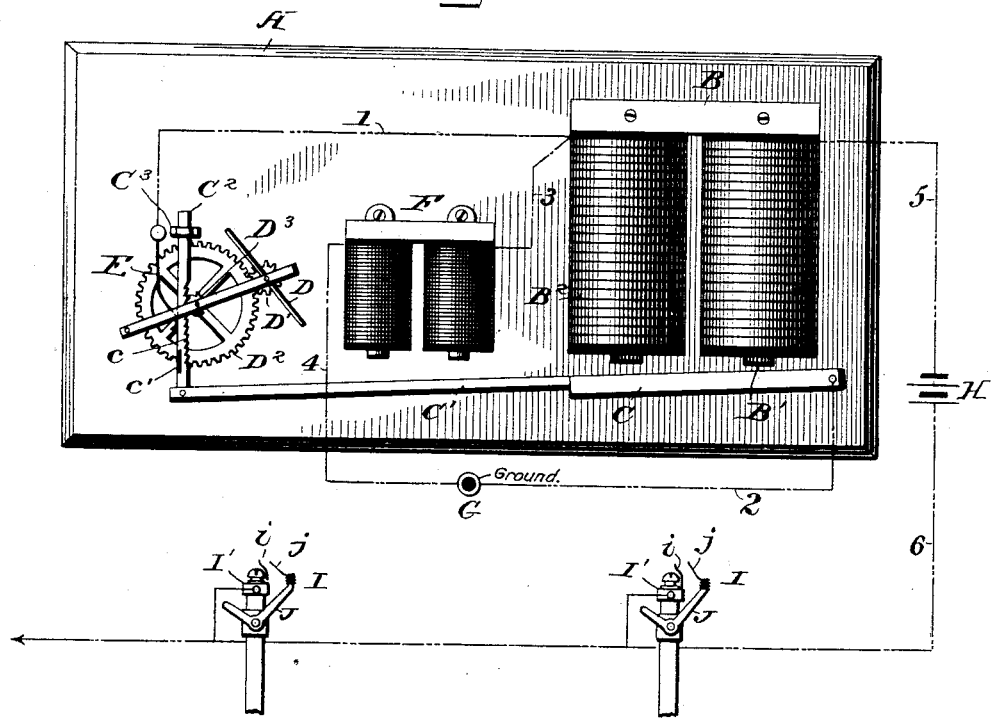
Figure 2:
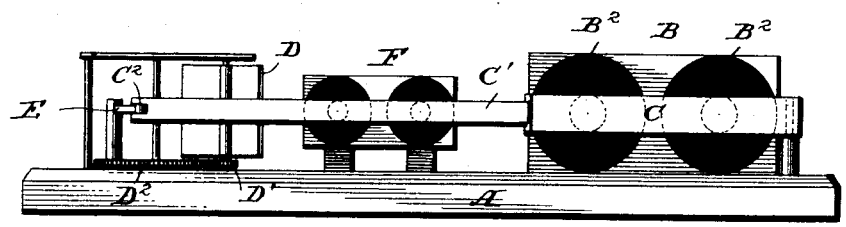

Referring to the accompanying drawings, Figure 1, is a side view of one embodiment of my invention showing the circuits sufficiently to explain the principles thereof; and Fig. 2, is a bottom plan view of the same.

It is well known that in the use of batteries for operating electric gas-lighting devices and the like, it is generally desirable to use what are known as "open circuit" batteries, that is, batteries which shall be normally connected in an open circuit and which when, perchance, they are connected on a closed circuit, are liable to run down, become polarized or otherwise be exhausted, so as to be unable to produce sufficient current to accomplish the objects desired. It is also well known that in operating electric gas-lighting devices, the normal contact between the electrodes is of short duration, and the extra current produced by the so-called "spark" coil, is sufficient to explosively ignite the gas flowing from the tip, but in the operation of such devices it often happens, through inadvertance, accident or mistake, that the circuit remains closed an abnormally long time, and this exhausts the battery, in the manner above indicated, and renders the apparatus practically inoperative. Various protecting devices have been provided to remedy this evil, most of which operate on the principle of providing some mechanism which shall automatically break the circuit after a predetermined time, and keep the circuit broken until it is manually or otherwise restored, the fault or false contact having been corrected. It often happens that this false contact corrects itself within a certain period of time, but the lighting apparatus cannot be operated until the automatic cut-out is adjusted, and as this is usually in the cellar, or some other out-of-the-way place, much delay and inconvenience are caused thereby, and it is the object of my invention to provide a battery protecting device which shall not only automatically cut out the lighting circuit and keep it cut out as long as the fault or false contact remains in said circuit, but upon the correction of said fault, will automatically restore said lighting circuit, and put the apparatus in condition for immediate use.

My invention is based upon the well-known principle that when a so-called open circuit battery is included in a circuit of exceedingly high resistance, the battery does not become materially affected or de-energized, and I will now proceed to explain the preferred embodiment of my invention.

Mounted upon a suitable base or support A, is an electro-magnet B, and this operates to perform the functions of the usual spark coil of an electric lighting circuit, and to accomplish this I preferably use a core B', made up of separate bundles of wires, and the coil or coils $B^2$ are wound with a relatively coarse insulated conductor, such for instance as No. 14, or even larger, the object being to offer as little resistance as practicable to the passage of the electric current, but to produce relatively great magnetizing effects, so that when the circuit is broken at the burner, the extra spark will be as great and intense as is necessary to produce the instantaneous explosive ignition of the gas. This magnet is provided with an armature C, which is also provided with an extension C', and connected to this extension is some retarding device, such as a dash-pot, or fan, or other equivalent and well-known device, and I have shown in the present instance a fan D, mounted in suitable bearings and provided with a pinion D', engaging a gear wheel $D^2$, which is also mounted on a shaft, having a hub or ratchet wheel $D^3$, and connected to the armature or the armature extension, is an arm or rod $C^2$, having teeth or notches $c$, engaging the ratchet wheel $D^3$, the arm being guided in a suitable bracket or other device $C^3$. This arm $C^2$ is provided with an insulated portion, as $c'$, and arranged to bear on the arm is a spring-contact E, which also serves to assist in keeping the arm in engagement with the ratchet wheel, and this contact is connected by a wire or conductor 1 with the coil of the magnet B, while the armature C is connected by a conductor 2, with the ground G, shown in the form of an ordinary gas-pipe.

Arranged in shunt with the conductor 1 and connected to the coils of the magnet B by a wire 3, is a magnet F which is shown preferably as being smaller than the magnet B, and is wound with coils of a comparatively fine insulated conductor, say for instance, No. 36 wire, and these coils are of such size and thickness as to offer a relatively exceedingly high resistance, to the passage of the current, say for instance five thousand (5,000) ohms, and this magnet is also connected, as by a conductor 4, with the ground G.

The battery H may be placed in any convenient position in the circuit, and I have shown it connected by a conductor 5, with the coils of the magnet B, and by a conductor 6, which extends through the building and forms the lighting circuit, there being as many branches as are necessary or desirable, and at each burner I, one portion of the lighting device is connected to the circuit, the ring I' being shown as insulated from the burner tip, and provided with a fixed electrode $i$, against which the wiping electrode $j$, carried by the arm J, impinges, closing the circuit through the gas pipe at the particular burner, in the manner well understood. With this arrangement of circuits, and with the devices above described, the operation of my protector will be readily understood, and it will be seen that normally the parts are in position shown in Fig. 1, with the circuit open at the different burners, but when any one of the lighting devices is operated at any of the burners, the circuit is closed through the electrodes $i, j$, for the instant, and the magnet B is energized, and if the contact is practically instantaneous, as soon as the contact is broken, the magnet B is de-energized, and the extra current produces the desired sparking at the burner tip. As soon as the magnet B is energized by the closure of the circuit, it attracts its armature C, but this being retarded by some suitable device, as the fan arrangement D, it moves slowly, and in the normal operation of a gas-lighting device, does not disturb the electric circuit, but if perchance, the contact at the lighting devices remains closed a sufficient length of time, the armature C will be drawn toward the magnet B, and in so doing will raise the arm $C^2$ to a sufficient distance to allow the spring E to bear upon the insulated portion $c'$ on the arm, thus breaking the lighting circuit, and preventing wastage of battery power. In doing this, however, the extension C' of the armature C has been brought within the controlling influence of the magnet F, and this magnet remaining in circuit, is energized sufficiently to retain the armature in place, and keep the lighting circuit broken, while the circuit of the magnet F remains closed, and owing to the high resistance of the coils of this magnet, it does not injuriously affect the battery. If perchance then, the false contact is corrected and the circuit broken at this place, it follows that the circuit of the magnet F is also broken, and the armature C and its extension are restored to their normal position, by gravity, or a spring, or any other suitable device, and the whole apparatus is put into its normal condition, without the necessity of manual adjustment, and without destroying or weakening to any material extent, the force of the battery. It will thus be seen that by the exceedingly simple arrangement shown, I am enabled to provide not only an automatic cut-out for an electric lighting circuit, but an automatic restoring device as well, and while I have shown the preferred embodiment of my invention and one which has proved satisfactory, it is evident that the details of construction and arrangement of parts can be varied, without departing from the principles of my invention above explained.

What I claim is—

1. In an automatic circuit controller for electric gas-lighting devices, a spark coil, a cut-out device included in the circuit of the spark coil, and a high resistance device in a shunt around said cut-out device, substantially as described.

2. In an automatic circuit controller for electric gas-lighting devices, the combination with a spark coil; of an armature, a retarding device connected with the armature, and a cut-out device operated thereby, and a magnet of high resistance in a shunt around said cut-out device, substantially as described.

3. In an automatic circuit controller for electric gas-lighting devices, the combination with the spark coil; of the armature, the arm connected to the armature, the retarding device operated thereby, the cut-out also connected thereto, and the magnet of high resistance in a shunt from the spark coil, arranged to engage the armature, substantially as described.

In testimony whereof I have signed my name to this specification in the presence of two subscribing witnesses.

CHARLES L. MAYHEW.

Witnesses:
 FRED. M. WATERBURY,
 CHAS. N. HULKERT.